United States Patent [19]

Vanbeber

[11] Patent Number: 4,736,505

[45] Date of Patent: Apr. 12, 1988

[54] APPARATUS FOR REPLACING MACPHERSON STRUTS

[76] Inventor: Vernie F. Vanbeber, P.O. Box 588, Chouteau, Okla. 74337

[21] Appl. No.: 890,838

[22] Filed: Jul. 25, 1986

[51] Int. Cl.$^4$ .............................................. B23P 19/04
[52] U.S. Cl. ..................... 29/227; 254/10.5; 254/93 H
[58] Field of Search ................. 29/252, 283, 227; 254/10.5, 93 H

[56] References Cited

U.S. PATENT DOCUMENTS

| | | | |
|---|---|---|---|
| 1,342,529 | 6/1920 | Charland | 254/10.5 |
| 1,389,657 | 9/1921 | Harsley et al. | 29/227 |
| 1,466,796 | 9/1923 | Kibbe | 29/227 |
| 2,394,562 | 2/1946 | Plumley | 29/227 |
| 2,652,625 | 9/1953 | Perkins | 29/227 |
| 3,051,443 | 8/1962 | Castoe | 29/227 |
| 4,105,188 | 8/1978 | Mendoza et al. | 29/227 |
| 4,219,918 | 9/1980 | Klann | 29/227 |
| 4,237,594 | 12/1980 | Young | 29/227 |

Primary Examiner—Howard N. Goldberg
Assistant Examiner—Irene Golabi
Attorney, Agent, or Firm—Head & Johnson

[57] ABSTRACT

A method and apparatus for use in repairing or replacing parts of the suspension system, such as a MacPherson strut of an automobile which suspends a frame or passenger compartment from a lower portion which includes the wheels and the axle. The apparatus includes an elongated upright apparatus which has a piston rod extending out the top. A special mounted assembly is mounted on top of the piston rod with outwardly extending arms which exerts an upward force on the spring of the MacPherson strut. At the same time a chain is attached between the housing of the elongated tool and the frame or body to prevent upper movement of the frame. When the spring is compressed the shock absorber portion of the MacPherson strut can be removed and replaced.

8 Claims, 5 Drawing Sheets

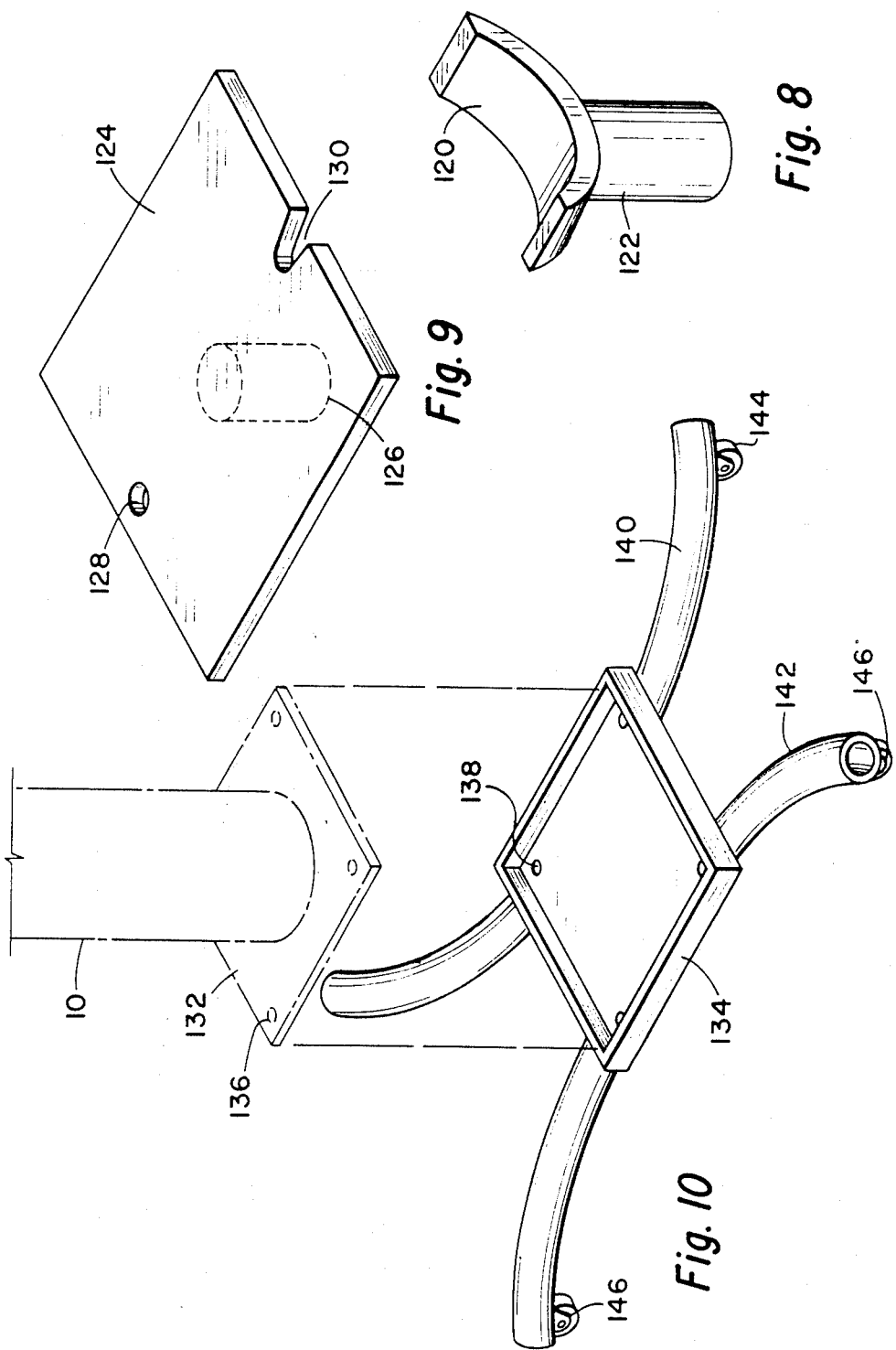

APPARATUS FOR REPLACING MACPHERSON STRUTS

BACKGROUND OF THE INVENTION

The present invention is concerned with a method and apparatus for repairing a vehicle such as an automobile which is lifted off the ground for service. It is especially directed toward a method and apparatus for repairing and replacing parts of the suspension systems using MacPherson struts.

When certain work needs to be done on a vehicle such as changing shock absorbers or springs, a common practice is to use a hydraulics lift to raise the automobile to above head height of the mechanic. A widely used jack or lift is one that has a large central hydraulically operated shaft which is extendable from the floor level to a height of six or seven feet or more. Adjustable arms are pivotally attached to the hydraulic lift so that after a car has been driven over the hydraulic shaft the arm can be extended outwardly so that they will be under the frame of the car. Then the hydraulic means is actuated and the car is lifted to the desired height.

When this occurs, it is apparent that the wheels are not directly supported by the hydraulic shaft or the arms but are supported by the suspension system. The tires are hanging down from their normal position in relation to the upper portion of the car and is held there only by the suspension system which is under tension and not in compression which is the normal state. The suspension system includes shock absorbers, springs and recently in most cars now being manufactured, the MacPherson struts. In the MacPherson strut, a strut assembly is mounted between the steering knuckle of a wheel and a strut bearing plate supported from the frame or body of the automobile. The strut assembly has a strut plate mounted therein. A coil spring is mounted around the strut assembly and is positioned under compression between the strut plate at the bottom and the strut bearing plate at the top. The strut assembly may be considered a modified shock absorber and it this strut assembly which needs to be replaced most often. A rubber mount is a part of the strut bearing plate. The rubber mount and the coil spring seldom need to be replaced. However the strut assembly needs replacing frequently. Under present methods when the shock absorber or the strut assembly needs to be replaced the whole MacPherson strut including the strut assembly and the coil spring including the strut bearing plate and rubber mount is removed from the automobile with the spring still in compression. The compression of the spring is between two parts of the strut assembly which are to be replaced. Extreme care and caution then has to be exercised in changing out the strut assembly so as to avoid injury to the mechanic. Typically it takes about one to two hours to replace one MacPherson strut using the conventional method and apparatus depending on the type automobile being serviced.

SUMMARY OF THE INVENTION

This invention shows a method and apparatus for assisting a mechanic in doing repair or replacement work on a vehicle having an upper portion including a frame or body supported by a suspension system such as springs, shock absorbers and the like from a lower portion such as the wheels and axle. One of the most widely used suspension system is the MacPherson strut. In this system the strut assembly, which is basically a shock absorber with a strut plate intermediate the ends of the shock absorber, is supported between the steering knuckle of the wheel and the frame of the automobile. A coil spring is mounted around the strut assembly between the strut plate and an upper spring holding or bearing plate which is usually held against a rubber mount by the force of the spring. When it is desired or necessary to change out the strut assembly of the MacPherson strut I compress the coil spring upwardly against the spring bearing plate until the lower end of the coil spring is free from contact with the strut plate and hold it in this compressed state. I then remove the nut from the strut mounting shaft at the upper end of the strut assembly and remove the strut mounting bolts from the steering knuckle at the bottom end of the strut assembly. The worn out strut assembly is then removed. An operable strut assembly is then attached to the steering knuckle and the nut placed on the strut mounting shaft. I relieve the compression on the spring until it contacts the strut plate. I can thus remove the strut assembly and replace it without removing the coil spring.

To accomplish the just-mentioned method of changing the shock absorber of a MacPherson strut I use a special, novel tool assembly or lifting jack. This jack has an upright cylindrical housing having a base for resting on the floor of a garage. The cylindrical housing supports an air cylinder having a piston therein and a piston rod extending out the top of the air cylinder. The top of the piston rod is provided with a strut removal assembly which includes a head plate and outwardly extending arms with cradles for engaging the underside of a coil of the coil spring. A pair of chains is connected near the upper end of the support housing and have hooks at the outer end for attaching to the frame or body of the vehicle. These chains are attached in a manner in which they are substantially tight and then as power is applied to the piston the shaft or piston rod is extended upwardly and compresses the coil spring of the MacPherson strut upwardly against the spring bearing plate which is held against upward movement by the chains connected to the frame. I can then change out the MacPherson strut as described above.

I can remove the strut removal assembly head plate from the upper end of the piston rod and replace it with other type heads which makes it multiple tool useful for other functions. For example I have a cradle with which I can replace the strut removal assembly heads with and it would receive the rear axle for example. I can also use a flat plate in a place of the cradle for lifting transmissions. This the tool is very versatile.

It is an important object of my invention to provide an apparatus and method whereby the strut assembly can be replaced without removing the spring and relative portion of the MacPherson strut from the automobile.

DESCRIPTION OF THE DRAWINGS

FIG. 8 illustrates a cradle assembly for mounting on the top end of the piston rod of the device of FIGS. 1 and 2.

FIG. 9 illustrates still another assembly for use with the top of the piston rod of the tool of FIGS. 1 and 2.

FIG. 10 shows the base of the stabilizing jack mounted on arms with castors or rollers attached.

DETAILED DESCRIPTION OF THE PREFERRED EMBODIMENTS

Figures 1, 2:
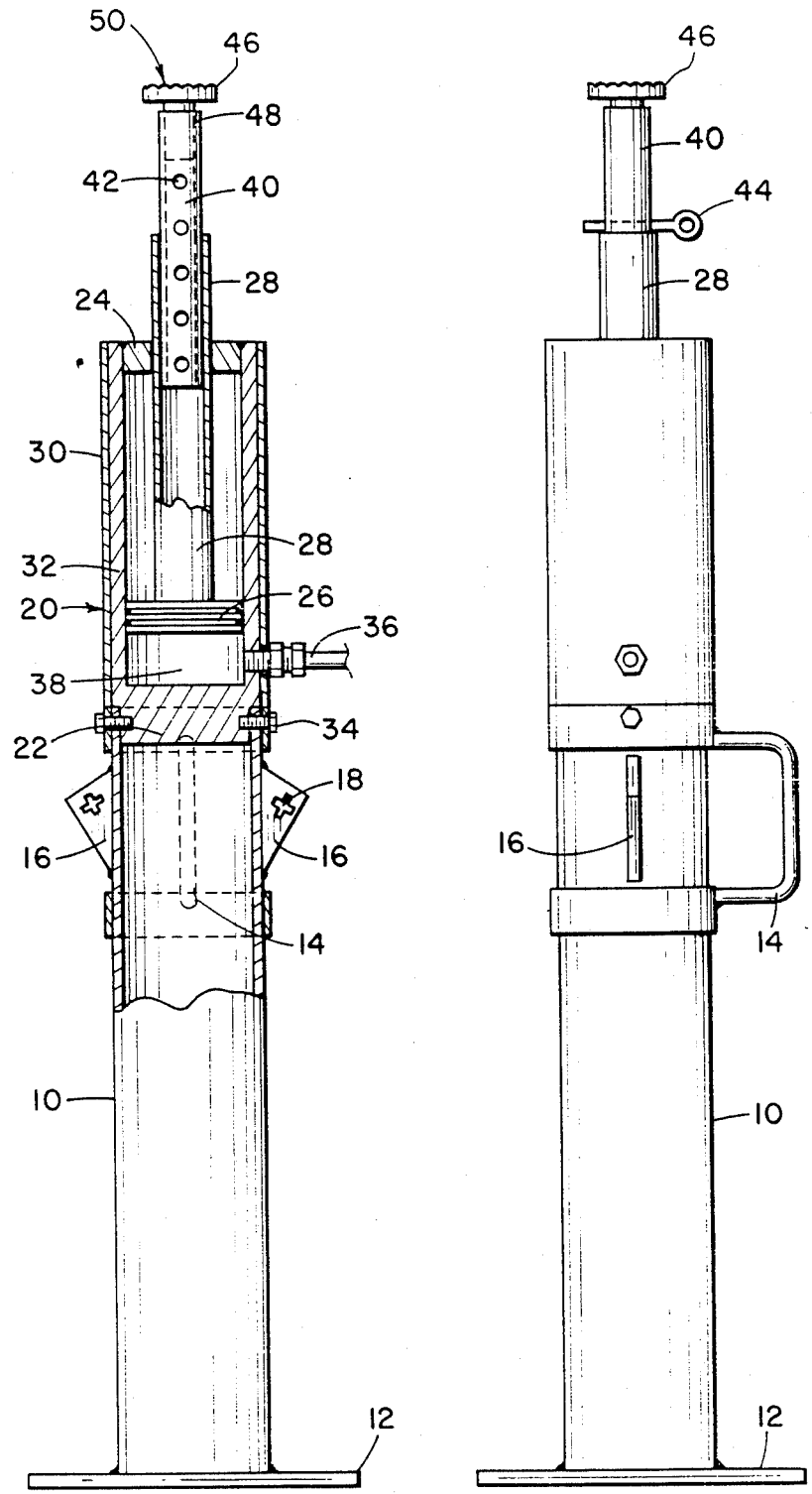
FIG. 1 shows a full-faced view of my stabilizing jack with a removable accessory head in place.
FIG. 2 is similar to FIG. 1 except the jack has been rotated ninety degrees and a portion of it is shown in a cutaway view.

Attention is first directed to FIGS. 1 and 2 which shows my lifting jack. Shown thereon is lower base support cylinder 10 supported from base 12. A handle 14 is provided for support cylinder 10 near its upper end. A pair of chain support fasteners 16 are mounted on the support cylinder 10 and are 180° apart. These chain support fasteners 16 contain a cross-shaped opening 18 for anchoring a section of chain therein. An air cylinder 20 is mounted on the upper end of support cylinder 10 and includes a base plug 22 and a top plug 24. A piston 26 having rod 28 is mounted within the air cylinder 20. The piston rod 28 extends upwardly through top plug 24. The air cylinder 20 is shown as having a sleeve 30 surrounding the internal air cylinder wall 32. Support screws 34 anchors the sleeve 30, support cylinder 10 and base plug 22 together. Sleeve 30 can very well be a part of the wall 32 of the air cylinder 20. An air supply conduit 36 is used to provide air to the interior of the air cylinder beneath the piston 26. Air is supplied from a source not shown and is controlled by a valve not shown so that the air pressure can be either injected or released from space 38 below the piston 26.

An extension 40 is provided at the upper end of piston rod 28 which is hollow. Extension 40 is provided with a plurality of position holes 42. A support pin 44 is placed through one of the position holes 42 to obtain the desired height. Extension 40 is hollow and a head assembly 50 having head 46 and stem 48 is placed therein.

Figure 3:
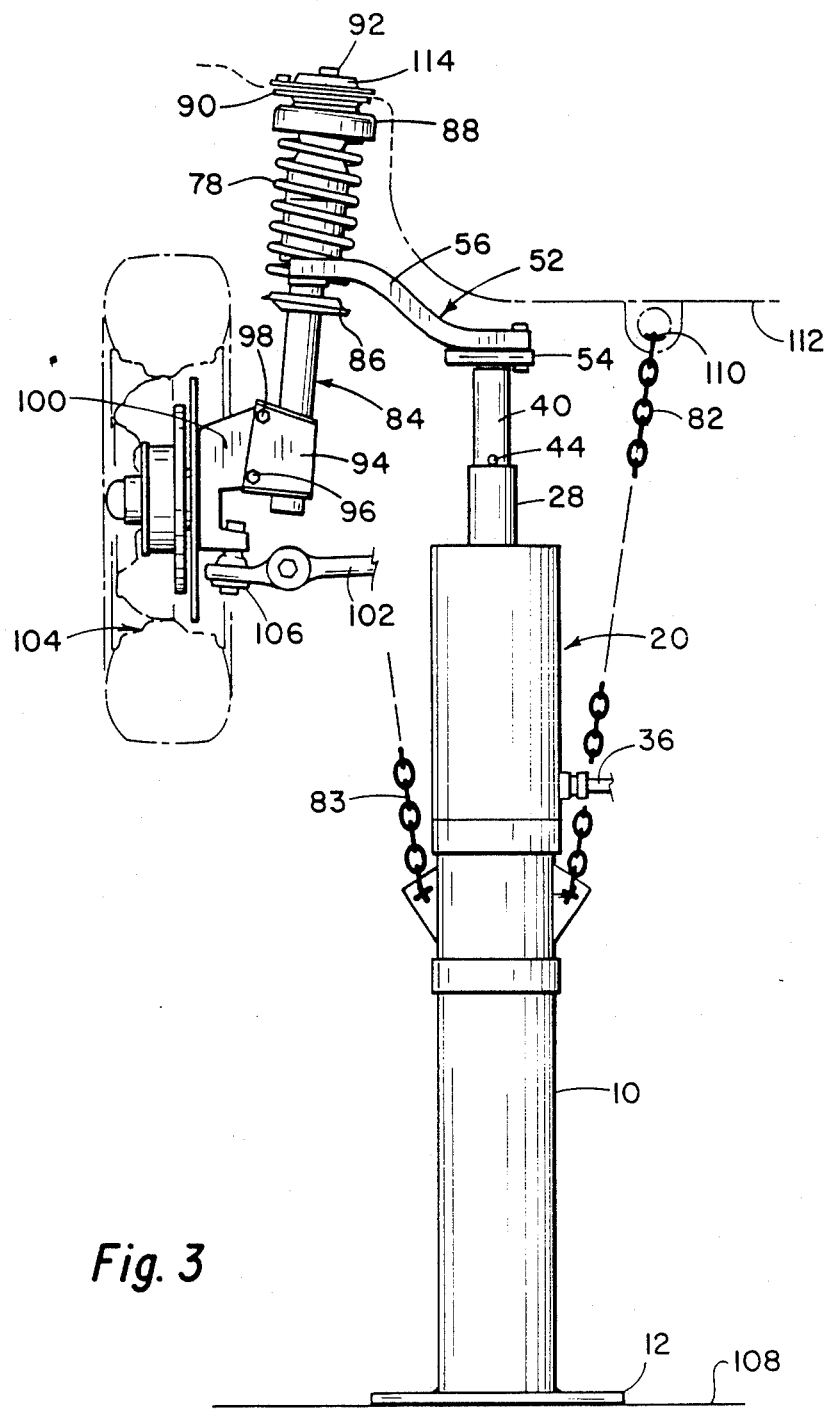
FIG. 3 illustrates the jack of FIG. 1 with a strut removal assembly head mounted on the top end thereof and shows it in position for doing repair on a MacPherson strut.
Figure 4:
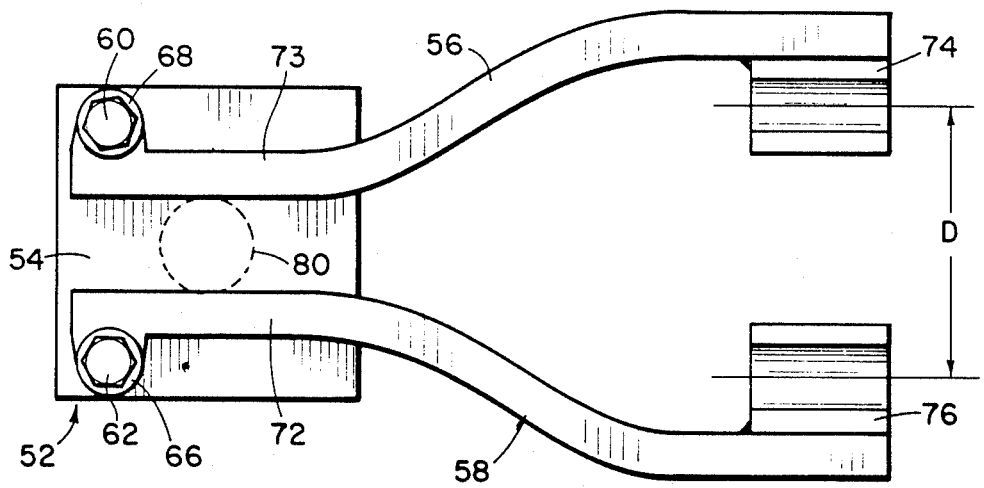
FIG. 4 is a top view of the strut removal assembly head.
Figure 5:
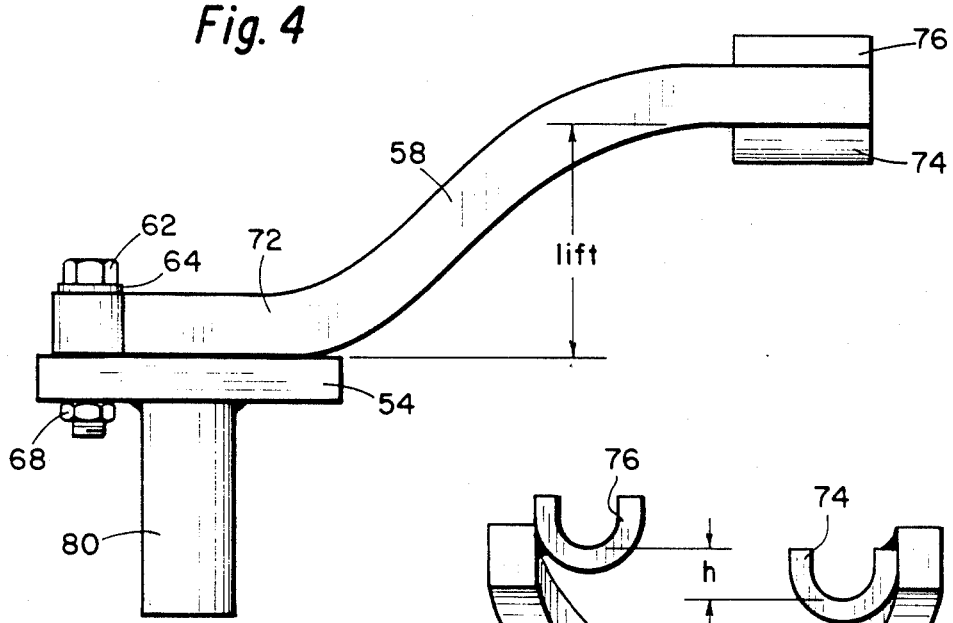
FIG. 5 is a side view of the strut removal assembly head of FIG. 4.
Figure 6:
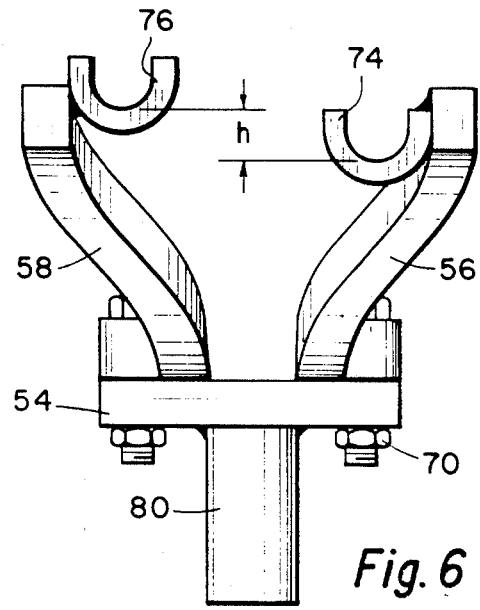
FIG. 6 is an end view of the strut removal assembly head.
Figure 7:
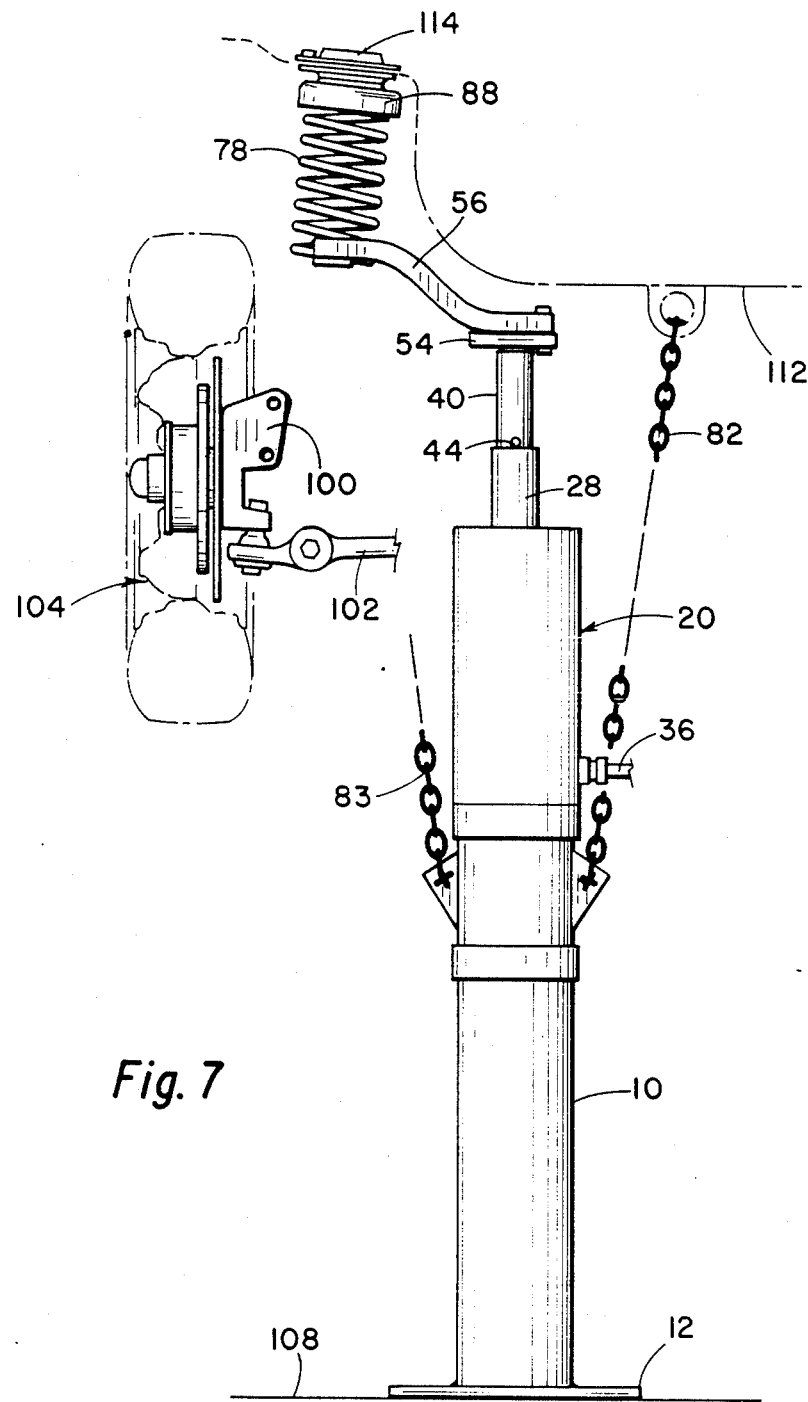
FIG. 7 is similar to FIG. 3 except this illustrates the strut assembly of the MacPherson strut removed.

The head assembly 50 can be replaced with a head assembly 52 which is illustrated in detail in FIGS. 4, 5 and 6, and is also illustrated in FIGS. 3 and 7. The head assembly shown in FIGS. 4, 5, and 6 is designed primarily for use for doing repair work or replacement of MacPherson struts. I will describe this assembly head before describing its use as illustrated in FIGS. 3 and 7. This head assembly 52 includes a strut removal head assembly plate 54 having stem 80, a first arm 56 and a second arm 58 which is supported from head assembly plate 54 by pivot bolts 60 and 62. Pivot bolt 62 is set in a hole in section 66 of each arm and is secured there by nut 78 placed on washer 64. Pivot bolt 60 is likewise provided with a washer 68 and nut 70. Arms 56 and 58 are free to pivot about pivot bolts 60 and 62. As shown clearly in FIG. 5 arm 58 has a flat section 72 which rests on plate 54. As shown in FIG. 4 arm 56 has a flat section 73 similar to section 72. The ends of arms 56 and 58 are provided with a cradle 74 and 76 respectively for receiving a part of a spiral of a coil spring 78 of a MacPherson strut as shown in FIG. 3. As shown in FIG. 5 the outer ends of the arms is higher than flat section 72.

This height or difference in elevation is illustrated as lift in FIG. 5 and may typically be between about three and four inches. The purpose will be seen more clearly in regard to the description of FIG. 3. As shown in FIG. 4, arms 56 and 58 are bowed out at its outer end or cradle so as to accommodate different size coil springs 78. The arms 56 and 58 can also pivot about pivot 60 and 62 which gives additional versatility as to accommodate different size coil springs 78. In regard to FIG. 4 the cradle 74 and 76 are distance "D" apart in which "D" equals the width of the spring. By rotating the arms about the pivot bolts 60 and 62, "D" can be varied to accommodate many different size coil springs. If arms 56 and 58 were fixed to plate 54, the "D" would be fixed and the accessory would accommodate only one size spring diameter.

Attention is next directed to FIG. 6 which shows spring coil cradles 76 and 74 at different elevations with respect to head plate 54. The difference is illustrated by "h". This is to accommodate a difference in elevation of two points along the coil of coil spring 78. This is important in that it prevents the spring from "cocking" sideways as the spring is lifted.

Attention is next directed to FIG. 3 which illustrates the tool of my invention being used to do repair work on a MacPherson strut. Shown thereon is a base 12 resting on the floor 108 of a garage. Chains 82 has a hook 110 at its upper end where it is attached to a frame 112 of an automobile. A second chain 83 is also provided and it too has a hook not shown at its outer end. The lower end of the chains are passed through the cross-opening 18 of a chain support fastener 16 until it is reasonably tight. And then it is secured there. Also shown in FIG. 3 is a wheel 104 having lower ball joint 106 and lower control arm 102 and a steering knuckle 100. The wheel is supported from the frame by a MacPherson strut which are well known and are used on nearly all new cars which are being produced at this time. The MacPherson strut includes a lower connecting assembly 94 having bolts 96 and 98 which connects it to the steering knuckle 100. The strut assembly 84 has a strut plate 86. The strut assembly 84 is basically a modified shock absorber and extends upwardly through strut bearing plate 90 and is held in position by a nut 92 placed on its strut mounting shaft. The upper end of spring 78 is held in position about the strut assembly by spring bearing plate 88 and its lower end by strut plate 86 which is secured to the strut assembly 84. A rubber mount 114 is also provided. I have just described the main components of a MacPherson strut.

The most common thing that goes wrong with a MacPherson strut is that the shock absorber or the strut assembly 84 must be replaced. I will now explain how my device can be used in the process of removing the strut assembly 84. I place my lifting jack in essentially the position shown in FIG. 3. I then position extension 40 so that the cradles 74 and 76 of arms 56 and 58 can be placed to receive the two parts of a coil of the spring 78. These positions are approximately 180° apart. The arm 56 and 58 each curves upwardly so that spring cradle 74 and 76 are higher than plate 54. This permits the arms to lift and compress the spring 78 before plate 54 strikes the frame 112. At this time I connect chains 82 and 83 to frame 112. I then tighten these chains by pulling them through cross-hole 18 of chain support fasteners 16 until I have them reasonably tight. I then activate air cylinder 20 by applying air under pressure through conduit 36. This causes piston rod 28 to extend and forces up plate 54 and arms 56 and 58. By holding down on automobile frame 112 at the same time arms 56 and 58 are pushed I compress spring 58. This is continued until I have it in approximately the position shown in FIG. 3. At this time it will be clearly seen that the lower end of coil spring 78 is clear of contact with strut plate 86 upon which it normally rests. At this time strut assembly 84 is completely free of spring 78. I then hold the spring in this compressed position. I next remove strut mounting shaft nut 92 from the top of the assembly and remove strut bolts 96 and 98 from the steering knuckle 100. I then remove the strut assembly 84. FIG. 7 illustrates the stage of the operation wherein the strut assembly 84 has been completely removed and the spring 78 is held in position by my tool. I next replace the worn out strut assembly with a new assembly. I then replace a shft nut 92 at the top of the assembly, replace strut mounting bolts 96, 98 and secure them. At this time I can relieve the pressure on the air cylinder and then spring 78 will expand down to where the lower end thereof contacts strut plate 86. I remove arms 56 and 58 and have completed the repair of the MacPherson strut without removing the coil spring and associated parts from the automobile. I can do this in about 15 minutes whereas prior method without my invention requires between about one to two hours which is the way it is done now in garages across the United States and the rest of the world. My method and apparatus is also much safer inasmuch as spring 78 stays in position with the automobile and does not have to be handled under compression when it's away from the car to change the struts as is presently being done.

Although as I just said the most common ailment is the failure of the shock absorber and I just got through explaining how to change that out. However, occasionally the rubber mounts may wear out or the spring may need replacing. I can also accomplish that with my device here. If the bearing plate or other parts of the MacPherson needs replacing I release the pressure on the air cylinder so that the spring 78 can expand until it is no longer under compression. When the spring is no longer under compression it is very easy and safe to take it out. I then put in a new bearing plate or rubber mounts as needed in conjunction with the spring. I then use my lifting jack and accessories to compress the spring and put in a new strut assembly as described above. Then connect the three bolts 96, 98 and 92 at the top. I then relieve the upper portion on the spring 78 until the spring is seated against the strut plate 86. I then remove my lifting tool and the MacPherson strut has been complete repaired as may be required.

FIGS. 8 and 9 show two additional type accessory heads for use with my lifting jack. Shown in FIG. 8 is an accessory head which has a cradle 120 and a stem 122 which can be mounted in extension 40. This cradle 120 can be used for example for lifting the rear end position of the rear axle or under the harmonic balancer of the engine block. FIG. 9 is still further modification of the accessory head and includes a flat plate 124 and a stem 126. The flat plate has a hole 128 for a chain and groove or slot 130 for chain locking notch. This accessory can be used with my lifting jack tool for placing a transmission thereon in position with a chain not shown utilizing hole 28 and locking notch 130.

FIG. 10 shows a modification of the basic tool so that it can be rolled from position to position. Shown thereon is a base 132 which sets in base frame 134 and can be held there by placing bolts through holes 136 in base plate 132 and holes 138 in base frame 134. Base frame 134 is supported by base arms 140 and 142 which have castors 144 and 146 at the end thereof. Typically the dimension of base frame is 12" by 12" and the castors are typically about 3' apart.

While the invention has been described with a certain degree of particularity, it is manifest that many changes may be made in the details of construction without departing from the spirit and scope of this invention. It is understood that this invention is not limited to the embodiments set forth herein for purposes of exemplification, but is limited only by the scope of such claim or claims including the full range of equivalancy to which each element thereof is entitled.

What is claimed is:

1. An apparatus for use with a vehicle having an upper portion supported by a suspension system from a lower portion including wheels and in which the upper portion has attachment means which comprises:
   a housing having a chain support fastener on its outer walls, a top and a base for resting on the floor;
   an air-powered ram supported at the top of said housing and having an extension means telescopically extendable therefrom;
   hooks for attaching to said upper portion;
   chains connectable to said chain support fastening of said housing and attached to said hooks;
   a strut removal assembly attachable to said extension means, said strut removal assembly comprising:
      a plate having a flat surface and a first and second hole extending therethrough and opening through said flat surface;
      a first arm and a second arm, each having a hole near one end;
      a first pivot bolt extending through a hole in said plate connecting said first arm to said plate;
      a second pivot bolt extending through a hole in said plate connecting said second arm to said plate whereby said first arm and second arm may pivot respectively around said first and said second pivot bolts; and
      a first spring cradle attached to said first arm and a second spring cradle attached to second arm, each said cradle opening in a direction away from said base.

2. An apparatus as defined in claim 1 in which each said arm has a first straight flat portion which mates with the surface of said plate and the ends of each said arm opposite said hole bows outwardly.

3. An apparatus as defined in claim 2 in which said base has a stem for connecting to said extension means and in which each said arm curves upwardly in a direction opposite the stem on said plate.

4. An apparatus as defined in claim 3 in which the first and second cradles are at different distance from the plane defined by the surface of said plate.

5. An accessory head useful in repairing MacPherson struts which comprises:
   a first plate having a stem on one side and a surface on a second side defining a plane;
   a first arm and a second arm each having a first flat section at one end and a second end;
   first pivot means having a pivot axis essentially perpendicular to said plane to pivotally connect said first section to said plate;
   second pivot means having a pivot arm essentially perpendicular to said plane to pivotally connect said flat section of said second arm to said plate; and a first spring cradle and a second spring cradle at the second ends of said first and second arms, the cradles being at unequal distances from the plane of said plate.

6. An accessory head as defined in claim 5 in which the first and second arms are bowed in opposite directions.

7. An accessory assembly for use with a jack which comprises:

a first arm having a first straight section, a first hole through said first straight section, a second straight section and a curved section connecting said first and second straight section;

a second arm having a first straight section, a first hole through said first straight section, a second straight section and a curved section connecting said first and second straight sections;

a plate having a first hole and a second hole and a surface defining a plane, said first hole and said second hole each having an axis which is perpendicular to said plane;

a first pivot bolt placed through said first hole of said plate and said first hole of said first arm;

a second pivot bolt placed through said second hole of said plate and said second hole of said second arm;

the lower surface of said second straight section of said first and second arm defining a plane which is a selected distance from said plane of the plate;

a first and second spring-receiving cradle on said second sections of said first and second arms;

one of said spring cradles being a greater distance from said plane defined by surface of said plate then said second spring cradle.

8. An accessory assembly for use with a jack which comprises:

a first arm having a first end, a second end and a curved section connecting said first end and second end;

a second arm having a first end, a second end and a curved section connecting said first and second ends of said second arm;

a plate having a stem with an axis;

a first connecting means connecting said first end of said first arm to said plate;

a second connecting means connecting said first end of said second arm to said plate;

a first and second spring-receiving cradle on said second ends of said first and second arms, the opening of the receiving mouth of each cradle is in a direction away from said plate, each cradle having a bottom point, there being a first plane perpendicular to said axis and containing the bottom point of said first cradle and a second plate perpendicular to said axis and containing the bottom point of said second cradle, said first and second planes being a selected distance apart.

* * * * *